Patented Jan. 25, 1927.

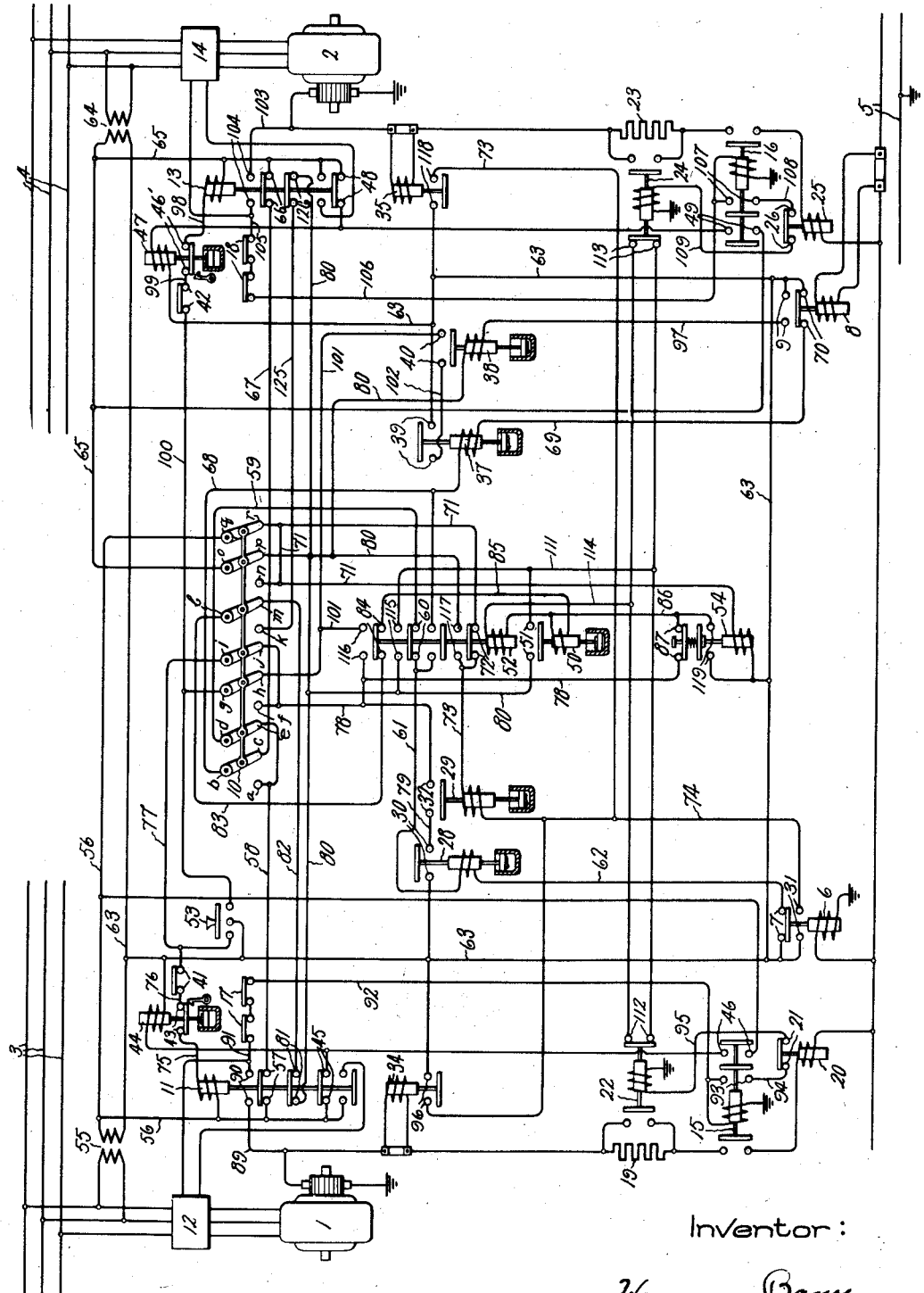

1,615,669

UNITED STATES PATENT OFFICE.

HERMAN BANY, OF SCOTIA, NEW YORK, ASSIGNOR TO GENERAL ELECTRIC COMPANY, A CORPORATION OF NEW YORK.

AUTOMATIC SWITCHING SYSTEM.

Application filed February 6, 1925. Serial No. 7,422.

My invention relates to automatic switching systems and particularly to automatic switching systems which are adapted to effect the operation of a plurality of devices in a predetermined sequence.

My invention is of particular utility in multiple-unit automatic substations in which normally one unit is adapted to be put into service automatically in response to one condition and another unit is adapted to be put into service automatically in response to another condition. Means are usually provided whereby any one of the units may be selected as the one normally adapted to be put into service in response to a predetermined condition. If for any reason the automatic switching equipment for one of the units in a multiple unit station or one of the units fails to function properly when there is a demand for its operation, it is very desirable that the operation of the automatic switching equipment of another one of the units be effected to place it in service.

An object of my invention is to provide improved means for effecting the operation of the automatic switching means associated with a unit of a multiple-unit automatic switching station to put said unit into service upon the failure of another unit or the automatic switching means thereof to function properly.

Another object of my invention is to provide an arrangement whereby the sequence in which a plurality of units are arranged to be placed in service automatically in response to predetermined sequence of events may be changed without necessitating the shutting down of the units before the change can be effected.

My invention will be better understood from the following description, taken in connection with the accompanying drawing and its scope will be pointed out in the appended claims.

In the accompanying drawing I have shown diagrammatically a portion of an automatic switching equipment for a two unit synchronous converter substation. It is to be understood, however, that my invention is not limited to an automatic switching equipment for a plurality of synchronous converters since it will be evident that the invention also is applicable to automatic switching equipments for motor generator, static transformer, prime mover dynamo electric, and other generating and transforming stations comprising two or more units.

Referring to the drawing 1 and 2 are synchronous converters which are arranged to be connected between the alternating current supply circuits 3 and 4 respectively, and a direct current load circuit 5 so as to transfer electrical energy from the supply circuits to the load circuit.

Normally one of the machines, called the leading machine, is arranged to be placed in service automatically whenever the voltage of the load circuit 5, which is energized at some other point, is below a predetermined value so that the voltage relay 6 opens its contacts 7. The other machine, called the trailing machine, is placed in service when the output of the leading machine exceeds a predetermined value so that the overcurrent relay 8, which is so connected as to be responsive to the combined current output of the two machines, closes its contacts 9. The position of the double-throw change-over switch 10 determines, in a manner hereafter described, which one of the two machines is the leading machine. When the switch 10 is in the position shown the machine 1 is the leading machine so that when the voltage relay 6 opens its contacts 7, the operation of the automatic switching means associated with the machine 1 is effected to put the machine 1 into service, and when the overcurrent relay 8 closes its contacts 9 the operation of the automatic switching means associated with the machine 2 is effected to put the machine 2 into service. When the switch 10 is in its other position, the machine 2 is the leading machine and the machine 1 is the trailing machine.

The automatic switching means associated with each converter for effecting the starting of the converter and its connection to the supply and load circuits may be of any suitable type, examples of which are well known in the art. In order to simplify the drawing the entire automatic switching means for each machine is not shown, but only the necessary portions thereof which are deemed necessary for a clear understanding of the present invention.

The automatic switching means for the converter 1 comprises a master relay 11, which, when energized, effects the operation of suitable switching means 12 (not shown in detail) whereby the connections of the converter to the supply circuit 3 and the excitation of the converter are automatically controlled in any suitable manner to effect the starting of the converter and the proper polarity and magnitude of the direct current voltage of the converter when it reaches synchronous speed.

The automatic switching means for the converter 2 similarly comprises a master relay 13, which when energized, effects the operation of suitable switching means 14 (not shown in detail) whereby the connection of the converter to the supply circuit 4 and the excitation of the converter are automatically controlled to effect starting of the converter and the proper polarity and magnitude of the voltage of the converter when it reaches synchronous speed. Examples of suitable means for accomplishing the results, which are accomplished by 12 and 14, are old and well known in the art, and since they, per se, form no part of my invention I deem it unnecessary to complicate the drawing by showing these means in detail.

The master relay 11 also controls the main direct current circuit breaker 15 which connects the converter 1 to the direct current load circuit 5, so that the converter 1 is disconnected from the circuit 5 as soon as the master relay 11 is deenergized. Similarly the master relay 13 is arranged to control the circuit breaker 16 which connects the converter 2 to the direct current load circuit 5 so that the converter 2 is disconnected from the circuit as soon as the master relay 13 is deenergized.

The circuit breakers 15 and 16 also are controlled by other suitable automatic means whereby the circuit breakers cannot be closed automatically until the respective converters have reached the proper condition to be connected to the direct current circuit 5. Examples of such automatic means are well known in the art. In order to indicate the use of such means for preventing the premature closing of the circuit breakers 15 and 16, contacts 17 and 18 are shown respectively in the closing circuits of the circuit breakers 15 and 16.

As shown in the drawing the output of each converter is arranged to be limited under abnormal load conditions by means of a current limiting device which is connected in series between the converter and the load circuit when the current output of the converter exceeds a predetermined value. A current limiting resistor 19 is connected in series between the converter 1 and the load circuit 5 when the circuit breaker 15 closes. If the current output of the converter 1 is below a predetermined value after the closing of the circuit breaker 15, so that the overload relay 20 does not open its contacts 21, a circuit breaker 22 is closed to short circuit the resistor 19 and connect the converter 1 directly to the load circuit 5. While I have shown only one step of resistance between the converter and the load circuit, any number of steps may be used in a manner well known in the art. In case several steps are used the resistor 19 preferably would be the last one to be short circuited. Similarly a current limiting resistor 23 is connected in series between the converter 2 and the load circuit 5 when the circuit breaker 16 closes and a circuit breaker 24 is arranged to short circuit the resistor 23 when the current output of the converter 2, while it is in service, is not sufficient to cause the overload relay 25 to open its contacts 26.

The master element 6 has two relays 28 and 29 associated therewith for controlling the circuit of the master relay of the leading machine. Normally the circuit of the relay 28 is completed through the contacts 7 of the master element 6 so that the contacts 30 are open. When the master element 6 is in the starting position, which in the arrangement shown is when the voltage of the load circuit 5 is below a predetermined value, the contacts 7 are open and the relay 28 is deenergized. The relay 28, however, is a time delay relay of any suitable type, examples of which are well known in the art, so that the contacts 30 are not closed until after the relay has been deenergized a predetermined length of time. The purpose in making a relay 28 a time delay device is to prevent a low direct current voltage, which lasts for only a short time, from effecting an unnecessary starting up of one of the converters.

The circuit of the relay 29, called the stopping relay, is completed through the contacts 31 of the master element 6, when it is in the starting position. The contacts 32 of the relay 29 are connected in the circuit of the master relay of the leading machine by means of the change over switch 10 so that the deenergization of the relay 29 after a predetermined time will effect the deenergization of the master relay of the leading machine. It will be evident that when the leading machine has been placed in service the voltage of the load circuit 5 is restored to its normal value so that the master relay 6 opens its contacts 31 and closes its contacts 7. In order to prevent the relay 28 from opening the contacts under these conditions the circuit of the relay 28 is arranged to be opened whenever the master relay of the leading machine is energized; and in order to prevent the relay 29 from being deenergized, a short circuit is arranged to be completed around the contacts 31 of the master relay 6, when the leading machine is placed in service. As shown a relay 34, which is responsive to the direct current output of the converter 1, is provided for completing a shunt circuit around the contacts 31 so as to maintain the circuit of the relay 29 completed as long as the converter 1 is in service and the output of the converter is above a predetermined value. Also a relay 35, which is responsive to the direct current output of the converter 2, is provided for completing a shunt circuit around the contacts 31 so as to maintain the circuit of the relay 29 completed as long as the converter 2 is in service and the output thereof is above a predetermined value. In order to prevent the leading machine from being shut down on small outputs of short duration, the relay 29 is a time delay relay of any suitable type, examples of which are well known in the art, whereby the relay 29 does not open its contacts 32 until after the relay has been deenergized for a predetermined length of time.

The master element 8 for the trailing converter also has two relays 37 and 38 associated therewith which control the circuit of the master relay of the trailing converter. These relays are arranged so that the relay 37 is deenergized and the relay 38 is energized when the master element 8 moves to its starting position, and the relay 37 is energized and the relay 38 is deenergized when the master element 8 moves to its stopping position. The contacts 39 and 40 of the relays 37 and 38 respectively are connected in the circuit of the master control relay of the trailing converter by the control switch 10 so that when both of these contacts are closed the master control relay of the trailing converter is energized. In order to prevent unnecessary starting and stopping of the trailing converter the relays 37 and 38 preferably are arranged in any suitable manner, examples of which are well known in the art, so that the relay 37 does not close its contacts 39 until after the relay has been deenergized for a certain length of time and the relay 38 does not open its contacts 40 until after the relay has been deenergized for a certain length of time.

The circuit of each master relay also includes normally closed contacts of suitable protective devices whereby the relay is deenergized to effect the shutting down of the associated converter when certain predetermined abnormal conditions occur in the converter or apparatus associated therewith. Examples of such protective devices are well known in the art. 41 represents contacts of such protective devices in the circuit of the master relay 11, and 42 represents contacts of such protective devices in the circuit of the master relay 13.

The circuit of the master relay 11 also includes the contacts 43 of a starting protective relay 44 whereby the relay 11 is deenergized in case the converter 1 is not connected to the load circuit 5 within a predetermined length of time after the relay 11 is energized. As shown the circuit of the relay 44 is completed by the contacts 45 of the master relay 11 when it is deenergized. When the master relay 11 is energized, the relay 44 is deenergized, but the relay is arranged in any suitable manner so that it does not open its contact 43 until after a predetermined length of time which under normal conditions is long enough to permit the automatic switching equipment to complete its operation and connect the converter 1 to the load circuit 5. The auxiliary contacts 46 on the circuit breaker 15 complete a circuit for the relay 44 when the circuit breaker 15 is closed. Therefore if the automatic switching equipment functions properly the relay 44 does not have time to open its contacts before the contacts 46 are closed. In case the automatic switching equipment does not function properly, the relay 44 does open its contacts 43, and the deenergization of the master relay 11 and the shutting down of the converter 1 are effected. In order to prevent the automatic equipment from operating again until after it has been inspected the relay 44 is arranged in any suitable manner so that the contacts 43 are held in their open position after being opened by the deenergization of the relay.

The circuit of the master relay 13 also includes the contacts 46' of a similarly arranged protective relay 47 whereby the relay 13 is deenergized and the converter 2 is locked out in case the converter 2 is not connected to the load circuit within a predetermined length of time after the contactor 13 is energized. As shown, the circuit of the starting protective relay 47 is completed by the contacts 48 of the master relay 13. When the master relay 13 is energized, the relay 47 is deenergized but does not open its contacts 46' immediately. If the automatic switching equipment for the converter 2 functions properly, the circuit breaker 16 is closed before the relay 47 has time to open its contact 46', and the closing of the auxiliary contacts 49 on the circuit breaker 16 completes the circuit of the relay 47.

In order to effect the automatic starting of the trailing machine when the leading machine or the automatic switching equipment therefor fails to function properly, a relay 50, called the emergency starting relay, is provided. This relay 50 is arranged so that whenever the starting circuit through the contacts 30 and 32 of the relays 28 and 29 respectively is completed, this relay is energized if the source for the trailing machine is energized. The relay 50, however, is arranged in any suitable manner, examples of which are well known in the art, so that it does not close its contacts 51 until after the relay has been energized for a sufficient length of time to allow the master relay of the leading machine to pick up, this master relay being energized at the same time the relay 50 is energized. By means of the change-over switches 10 the circuit of the relay 50 is connected so that it is supplied by the source for the trailing machine and includes contacts of the master relay of the automatic switching equipment of the leading machine which are closed when the master relay is deenergized. Therefore, the relay 50 closes its contacts 51 when the source for the trailing machine is energized and the master relay of the automatic switching equipment for the leading machine fails to pick up immediately after the contacts 30 and 32 in the starting circuit are closed.

The emergency starting relay 50, by closing its contacts 51, completes the circuit for the control relay 52 which effects the necessary changes in the connections so that master relay of the trailing machine is placed under the control of the relays 6, 28 and 29. The trailing machine, if it is in an operative condition, then is placed in service automatically and remains in service until the output thereof remains below a predetermined value for a certain length of time or the leading machine is started and put into service in parallel with the trailing machine. In case the normally trailing machine is operating as the leading machine through failure of the leading machine or the automatic switching equipment therefor, and the normally leading machine is placed back in service, the control relay 52 can be deenergized only when both of the circuit breakers 22 and 24 are closed, thus showing that both machines are connected to the load circuit in parallel and neither one is overloaded. When control relay 52 is deenergized under these conditions, each automatic switching equipment is transferred back automatically to its normal status of leading and trailing machine, and is controlled by it own master element.

In order that the change-over switch 10 may be operated to change the sequence in which the machines 1 and 2 operate without interrupting the service when one or both machines are in operation, a switch 53 is provided. This switch, when closed, completes circuits for both of the master relays 11 and 13, which are independent of the master relays 6 and 8 and their respective control relays. Therefore by just closing the switch 53 the change-over switch 10 may be changed from one position to the other to effect the necessary changes in the connections to change the sequence in which the machine operates without any interruption in service.

In order that the trailing machine may be placed in service as soon as possible when the source supplying the leading machine fails while the leading machine is in service, an undervoltage relay 54 is provided which is connected to the supply circuit for the leading machine by the change-over switch 10. Whenever the source supplying the relay 54 fails, the relay 54 completes a circuit for the emergency starting relay 50 so that the automatic switching equipment of the trailing machine is operated to place the trailing machine in service.

The operation of the system shown in the drawing is as follows: When both of the converters are shut down and the load connected to the load circuit is such that the master starting relay 6 does not open its contacts 7, the various devices of the system are in the positions shown. The change-over switch 10 is in the position to make the converter 1 the leading machine and the converter 2 the trailing machine.

Under the conditions assumed, a circuit is completed for the relay 28 from one secondary terminal of the control transformer 55, the primary winding of which is connected to the supply circuit 3 for the leading converter 1, through conductor 56, contacts 57 of the master relay 11, conductor 58, contacts $e$ and $d$ of the change-over switch 10, conductor 59, contacts 60 of the control relay 52, conductor 61, coil of relay 28, conductor 62, contacts 7 of the master starting relay 6, conductor 63 to the other secondary terminal of the transformer 55. A circuit also is completed for the relay 37 from one secondary terminal of the control transformer 64, the primary winding of which is connected to the supply circuit 4 for the trailing machine 2, conductor 65, contacts 66 of the master relay 13, conductor 67, contacts $c$ and $b$ of the change-over switch 10, conductor 68, coil of the relay 37, conductor 69, contacts 70 of the master starting relay 8, conductor 63 to the other terminal of the control transformer 64. It will be observed that the conductor 63 connects together the corresponding terminals of the two control transformers. This decreases the number of connections that have to be changed by the change-over switch 10 and the control relay 52 in order to accomplish the desired results which are accomplished by these devices. A circuit also is completed for the undervoltage relay 54 from the conductor 56, through the contacts $q$ and $r$ of the change-over switch 10, conductor 71, coil of relay 54 to the conductor 63.

As soon as the voltage across the load circuit 5 decreases below a predetermined value, relay 6 opens its contacts 7 and closes its contacts 31. The closing of the contacts 31 completes a circuit for the relay 29 from the conductor 56, through the contacts $q$ and $r$ of the change-over switch 10, conductor 71, contacts 72 of the relay 52, conductor 73, coil of the relay 29, conductor 74, contacts 31 of the relay 6 to the conductor 63. The relay 29 closes its contacts 32 immediately, but the relay 28, which is deenergized by the opening of the contacts 7, does not close its contacts 30 until after the contacts 7 have been open for a certain length of time. When the relay 28 does close its contacts 30, the starting circuit for the leading machine 1 is completed from the conductor 56, through coil of the master relay 11, conductor 75, contacts 43 of the relay 44, conductor 76, contacts 41 of the protective devices for converter 1, conductor 77, contacts $i$ and $j$ of the change-over switch 10, conductor 78, contacts 32 of the relay 29, conductor 79, contacts 30 of the relay 28 to the conductor 63. The closing of the contacts 30 also completes a circuit for the emergency starting relay 50 from the conductor 65, contacts $o$ and $p$ of the change-over switch 10, conductor 80, contacts 81 of the master relay 11, conductor 82, contacts $m$ and $l$ of change-over switch 10, conductor 83, contacts 84 of the control relay 52, conductor 85, coil of the relay 50, conductor 86, contacts 87 of the undervoltage relay 54, conductor 78, contacts 32 of the relay 29, conductor 79, contacts 30 of the relay 28 to the conductor 63.

If the leading machine 1 is in an operative condition, the master relay 11 picks up immediately and by opening its contacts 81 opens the heretofore described circuit of the emergency starting relay 50 so that it does not close its contacts 51. The master relay 11, by closing its contacts, effects the operation of the switching means 12 so that the converter 1 is started and brought to synchronous speed with the correct polarity. As soon as the converter 1 reaches the proper condition to be connected to the load circuit 5, all of the contacts 17 are closed so that a circuit is completed for the closing coil of the circuit breaker 15 from the ungrounded terminal of converter 1 through the conductor 89, contacts 90 of the master relay 11, conductor 91, contacts 17, conductor 92, closing coil of the circuit breaker 15 to the grounded terminal of the converter. If the current output of the converter does not exceed a predetermined amount when the circuit breaker 15 closes a circuit is completed for the closing coil of the circuit breaker 22 in order that this circuit breaker may close and short circuit the resistor 19, which is connected in series with the converter 1 when the circuit breaker 15 closes. The circuit of the closing coil of the circuit breaker 22 is from the grounded terminal of the converter 1, through conductor 89, contacts 90 of the master relay 11, conductor 91, contacts 17, conductor 92, auxiliary contacts 93 on the circuit breaker 15, conductor 94, contacts 21 of the overload relay 20, conductor 95, closing coil of the circuit breaker 22 to the grounded terminal of the converter 1.

When the master relay 11 picks up, the opening of its contacts 45 opens the circuit of the starting protective relay 44 which is connected directly across the conductors 56 and 63. The relay 44 begins to time, but if the automatic switching means for the converter 1 functions properly, the closing of the auxiliary contacts 46 on the circuit breaker 15 reconnects the relay 44 across the conductors 56 and 63 before the relay 44 opens its contacts 43 and deenergizes the master relay 11.

As soon as the converter 1 is connected to the load circuit 5, the voltage of the load circuit is restored to its normal value so that the voltage relay 6 opens its contacts 31 and closes its contacts 7. The closing of the contacts 7 at this time does not effect the energization of the relay 28 because its circuit is open at the contacts 57 of the master relay 11, and the opening of the contacts 31 does not effect the deenergization of the relay 29 because a short circuit is completed around these contacts by the contacts 96 of the relay 34 as soon as the converter 1 begins to supply current to the load circuit 5. The relay 34 is arranged so that it maintains its contacts closed so long as the current output of the converter 1 is above a predetermined value.

Under normal conditions the converter 1 remains in service until the current output decreases to such a low value that the relay 34 opens its contacts 96 and remains below this value for a sufficient length of time to allow the relay 29 to open its contacts 32. The opening of the contacts 32 opens the circuit of the master relay 11. The deenergization of the master relay 11 effects the opening of the circuit breakers 15 and 22 and the shutting down of the leading machine 1.

If the current output of the leading machine 1 exceeds a predetermined value while it is in operation, the master element 8 for the trailing machine 2 opens its contacts 70 and closes its contacts 9. The closing of the contacts 9 completes a circuit for the relay 38 from the conductor 65 through the contacts $o$ and $p$ of the change-over switch 10, conductor 80, coil of the relay 38, conductor 97, contacts 9 of the relay 8 to the conductor 63. The relay 38 closes its contacts 40 immediately, but the relay 37, which is deenergized by the opening of the contacts 70, does not close its contacts 39 until after the contacts 70 have been open for a certain length of time. Therefore, the contacts 39 are closed only when the current output of the leading machine exceeds a predetermined value for a certain length of time, thereby preventing overloads of a short duration from effecting the starting of the trailing machine. When the relay 37 does close its contacts 39, the starting circuit for the trailing machine is completed from the conductor 65 through the coil of the master relay 13, conductor 98, contacts 46' of the starting protective relay 47, conductor 99, contacts 42 of the protective devices for the trailing machine, conductor 100, contacts $g$ and $h$ of the change-over switch 10, conductor 101, contacts 40 of the relay 38, conductor 102, contacts 39 of the relay 37 to the conductor 63.

If converter 2 is in an operative condition so that the protective contacts 42 are closed, the master relay 13 picks up immediately. The master relay 13, when energized, effects the operation of the automatic switching means 14 so that the converter 2 starts and comes up to synchronous speed with the correct polarity. As soon as the converter 2 reaches the proper condition to be connected to the load circuit, all of the contacts 18 are closed so that a circuit is completed for the closing coil of the circuit breaker 16 from the ungrounded terminal of the converter 2 through the conductor 103, contacts 104 of the master relay 13, conductor 105, contacts 18, conductor 106, closing coil of the circuit breaker 16 to the grounded terminal of the converter 2. The closing of the circuit breaker 16 connects the converter 2 across the load circuit with the resistor 23 in series therewith. If the current output of the converter 2 does not exceed a predetermined value when the circuit breaker 16 is closed, a circuit for the closing coil of the circuit breaker 24 is completed as soon as the circuit breaker 16 closes. This circuit is from the ungrounded terminal of the converter 2 through conductor 103, contacts 104 of the master relay 13, conductor 105, contacts 18, conductor 106, auxiliary contacts 107 on the circuit breaker 16, conductor 108, contacts 26 of the overload relay 25, conductor 109, closing coil of the circuit breaker 24 to the grounded terminal of the converter 2. The closing of the circuit breaker 24 short circuits the resistor 23 so that the converter 2 is connected directly to the load circuit.

When the master relay 13 is energized, the opening of its contacts 48 opens the circuit of the starting protective relay 47, which is connected across the conductors 65 and 63. The relay 47 begins to time, but if the automatic switching means for the converter 2 functions properly, the closing of the auxiliary contacts 49 on the circuit breaker 16 reconnects the coil of the relay 47 across the conductors 65 and 63 before the relay 47 opens its contacts 46'.

Under normal conditions the trailing machine 2 remains in operation so long as the combined output of the two machines does not decrease below a value determined by the setting of the relay 8. When the combined output of the two machines decreases below a predetermined value, relay 8 opens its contacts 9 and closes its contacts 70. The closing of the contacts 70 at this time does not effect the energization of the relay 37 because its circuit is open at the contacts 66 of the master relay 13. The opening of the contacts 9 deenergizes the relay 38, which, after a predetermined time, opens its contacts 40. The opening of the contacts 40 opens the circuit of the master relay 13. The deenergization of the master relay 13 effects the opening of the circuit breakers 16 and 24, and the shutting down of the trailing machine 2.

Heretofore in the description it has been assumed that both of the sources 3 and 4, both of the machines 1 and 2, and all of the switching apparatus functioned properly. Let it now be assumed that when the relay 28 closes its contacts 30 after the master element 6 for the leading machine has opened its contacts 7 and closed its contacts 31, the master relay 11 fails, for some reason, to pick up. This may be due to one of the protective contacts 41 in the circuit of the master relay 11 being open. Since the relay 11 does not open its contacts 81 and thereby open the heretofore described circuit for the emergency starting relay 50, this relay closes its contacts 51 after a very short interval and completes a circuit for the control relay 52. This circuit is from the conductor 65, contacts $o$ and $p$ of the change-over switch 10, conductor 80, contacts 51 of the relay 50, conductor 111, contacts 112 of the circuit breaker 22 and contacts 113 of the circuit breaker 24 in parallel, conductor 114, coil of the control relay 52, conductor 86, contacts 87 of the undervoltage relay 54, conductor 78, contacts 32 of the relay 29, conductor 79, contacts 30 of the relay 28 to the conductor 63. The energization of the relay 52 places the master relay of the trailing machine under the control of the relays 6, 28 and 29, and also changes the connection of the various control devices, which are normally supplied by the transformer 55, so that they are supplied by the transformer 64.

When the control relay 52 closes its contacts 115 it completes a locking circuit for its coil which is independent of the contacts 51 of the relay 50 so that when these contacts 51 open due to the coil of the relay 50 being deenergized by the opening of the contacts 84 of the relay 52, the coil of the relay 52 is not deenergized. The closing of the contacts 116 connects the conductors 78 and 101 together so that the circuit of the master relay 13 is completed through the contacts 32 and 30 of the relays 29 and 28 respectively. The master relay 13 then effects the operation of the automatic switching means for the converter 2, which operates to place the converter 2 in service automatically in the manner described.

Before the converter 2 has been connected to the load circuit, but after the control relay 52 has been energized, the circuit of the relay 29 is from the conductor 65, through the contacts o and p of the change-over switch 10, conductor 80, contacts 117 of the relay 52, conductor 73, coil of relay 29, conductor 74, contacts 31 of the master relay 6 to the conductor 63. After the converter 2 has been connected to the load circuit 5 and the relay 6 opens its contacts 31, the circuit of the relay 29 is maintained closed through the contacts 118 of the underload relay 35 so long as the current output of the converter 2 is above a predetermined value.

When the output of the converter 2 decreases below a predetermined value so that the underload relay 35 opens its contacts 118 and maintains them open for a sufficient length of time to allow the relay 29 to open its contacts 32, the circuit of the master relay 13 is opened to effect the shutting down of the converter 2. Therefore, it will be observed that if the master relay of the leading machine fails to pick up immediately after the relays 28 and 29 close their contacts, the control relay 52 is energized to place the master relay of the trailing machine under the control of the relays 28 and 29.

If for any reason, such, for example, as the opening of the contacts 43 due to the circuit breaker 15 not being closed within a predetermined length of time after the circuit of the master relay 11 of the leading machine 1 is opened, the closing of the contacts 81 thereof completes the heretofor described circuit of the emergency starting relay 50. The relay 50 then effects the starting of the trailing machine 2 in the manner heretofore described.

It will be observed that the relays 28 and 29 normally are supplied from the source 3 for the leading machine 1. Therefore, if the source 3 fails while both machines are shut down and while the master relay 6 is in the position shown, the relay 28 becomes deenergized and closes its contacts 30 in the starting circuit. The closing of the contacts 31 of the relay 6 when the voltage of the load circuit decreases below a predetermined value, however, under these conditions would not complete the starting circuit because the relay 29 would not be energized although its circuit would be completed. In order that the relays 28 and 29 may function in the proper manner to effect the starting of the trailing machine when the relay 6 opens its contacts 7 and closes its contacts 31 under the conditions mentioned above, the undervoltage relay 54, which is connected by the change-over switch 10 so as to be responsive to the voltage of the leading source, completes a circuit for the emergency starting relay 50 when the voltage of supply circuit for the leading machine is below a predetermined value. This circuit is from conductor 65, contacts o and p of the change-over switch 10, conductor 80, contacts 81 of the master relay 11, conductor 82, contacts m and l of the change-over switch 10, conductor 83, contacts 84 of the control relay 52, conductor 85, coil of the emergency starting relay 50, conductor 86, contacts 119 to the conductor 63. Relay 50 effects the operation of the control relay 52 in the manner heretofore described so that the control relays 28 and 29 are supplied by the transformer 64, which is connected to the source of the trailing machine. Therefore, when the master relay 6 opens its contacts 7 and closes its contacts 31, the relays 28 and 29 operate to complete the starting circuit for the master relay 13 of the trailing machine if the contacts 7 remain open for a sufficient length of time to allow the relay 28 to close its contacts 30.

In order to prevent the control relay 52 from being deenergized and shutting down the trailing machine when the undervoltage relay 54 is energized by the reenergization of the supply circuit 3 while the machine 2 is in operation, the relay 54 is designed in any suitable manner so that it closes its contacts 87 before it opens its contacts 119. Therefore, the circuit for the relay 52 is completed through the contacts 32 and 30 of the relays 29 and 28 respectively to the conductor 63 before the circuit through the contacts 119 to the conductor 63 is opened.

It will be observed that the control relay 52 is energized only in case the leading machine or the source therefor, or the automatic switching equipment therefor, fails. In case the normally leading machine is placed back in service while the trailing machine is in operation, it is desirable not to have the trailing machine shut down until after the leading machine has been connected to the load circuit. This result is accomplished in the arrangement shown by having the circuit of the control relay 52 include the parallel-connected contacts 112 and 113 on the circuit breakers 22 and 24 respectively. Therefore, whenever the trailing machine is operating in place of the normally leading machine, and the leading machine is placed in parallel with the trailing machine, the opening of the auxiliary contacts 112 on the circuit breaker 22 which connects the leading machine to the load circuit, opens the heretofore described circuit for the control relay 52. The control relay 52, when deenergized, reconnects the control relays 28 and 29 across the conductors 56 and 63 and by opening its contacts 116 removes the master relay 13 from the control of the relays 28 and 29 so that it is placed under the control of master element 8. If the total current output of both machines is below a predetermined value so that the contacts 70 of the relay 8 are closed after the control relay 52 is deenergized master relay 13 becomes deenergized since its energizing circuit, under normal conditions, is open at the contacts 39 and 40, and the machine 2 is shut down. If, however, the load is sufficient to cause the relay 8 to maintain its contacts 9 closed after the control relay 52 is deenergized, the master relay 13 remains energized so that the machine 2 remains in operation until the total load decreases below a predetermined value.

By moving the change-over switch 10 to its other position, the necessary changes in the connections of the control devices are made so that the machine 2 becomes the leading machine and is controlled by the relays 6, 28, 29, 34 and 35, and the machine 1 becomes the trailing machine and is controlled by the relays 8, 37 and 38.

The changes in connections effected by moving the change-over switch 10 to its other position are as follows:—The conductor 68 is disconnected from conductor 67 and is connected to the conductor 58 so that the control relay 37, which controls the starting of the trailing machine, is energized by the source which supplies the trailing machine. The conductor 59 is disconnected from the conductor 58 and is connected to the conductor 67 so that the control relay 28, which controls the starting of the leading units, is energized by the source which supplies the leading machine. The conductor 100 is disconnected from conductor 101 and is connected to conductor 78 so as to place the master relay 13 of the leading machine under the control of the relays 28 and 29. The conductor 77 is disconnected from the conductor 78 and is connected to the conductor 101 so as to place the master relay 11 of the trailing machine under the control of the master element 8. The conductor 65 is disconnected from the conductor 80 and is connected to the conductor 71 so that the undervoltage relay 54 and the control relay 29 are energized from the source supplying the leading machine. The conductor 56 is disconnected from the conductor 71 and connected to the conductor 80 so that the control relay 38, the emergency starting relay 50 and the control relay 52 are connected across the source supplying the trailing machine. The conductor 83 is disconnected from the conductor 82 and is connected to the conductor 125 so that the emergency starting relay 50 is controlled by the contacts of the master relay of the leading machine.

It is believed that it will be evident from the drawing when taken in connection with the heretofore description, that when the change-over switch 10 is in the other position from that it occupies in the drawing, the machine 2 will be started when the voltage of the load circuit 5 decreases below a predetermined value, and will be shut down when the output of the machine 2 is below a predetermined value and that the machine 1 will be started when the load on the machine 2 exceeds a predetermined value or the machine 2 fails to start or fails while in operation, and will be shut down when the current output thereof is below a predetermined value if operating alone or the current output of both machines is below a predetermined value if both machines are in operation.

In order that the sequence in which the machines operate normally may be changed while one of them is in operation without interrupting the supply of current to the load circuit, the switch 53, when closed, completes the circuits of both of the master relays 11 and 13 independently of both master starting elements. Therefore, whenever the switch 53 is closed, both master relays are energized and both machines are put into operation if they are in an operative condition, and they remain in operation independently of the master starting elements 6 and 8 so long as the switch 53 is held closed. Therefore, whenever it is desired to change the sequence in which the two machines operate while one or more is in operation, this may be done without interrupting the supply of current to the load circuit by first closing the switch 53 and maintaining it closed for a sufficient length of time to allow the trailing machine to be started, if it is not in operation, and then moving the change-over switch to its other position and then opening the switch 53.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and and scope of my invention.

What I claim as new and desire to secure by Letters Patent of the United States, is

1. In combination, an electric circuit, a plurality of sources of current for supplying current to said circuit, automatic switching means associated with each source for controlling the connection thereof to said electric circuit, each automatic switching means comprising a master relay which when energized effects the operation of its associated automatic switching means to connect the source controlled thereby to said circuit and when deenergized to effect the operation of the associated switching means to disconnect the source from the electric circuit, control means for controlling the energization and deenergization of one of said master relays, electromagnetically operated means arranged when energized to effect the energization of another one of said master relays, a circuit for said electromagnetically operated means arranged to be completed when said control means is operated to effect the energization of said one of said master relays, and contacts in the circuit of said electromagnetically operated means controlled by said one of said master relays so that said last mentioned circuit is opened when said one of said master relays is energized.

2. In combination, an electric circuit, a plurality of sources of current for supplying current to said circuit, automatic switching means associated with each source for controlling the connection thereof to said electric circuit, each automatic switching means comprising a master relay which when energized effects the operation of its associated automatic switching means to connect the source controlled thereby to said circuit and when deenergized to effect the operation of the associated switching means to disconnect the source from the electric circuit, control means for controlling the energization and deenergization of one of said master relays, protective means associated with each source and its associated switching means for opening the circuit of the associated master relay under predetermined abnormal conditions of the source and its associated switching means, electromagnetically operated means arranged when energized to effect the energization of another one of said master relays, and a circuit for said electromagnetically operated means arranged to be completed when said one of said master relays is deenergized and said control means has been operated to effect the energization of said one of said master relays.

3. In combination an electric circuit, two dynamo electric machines adapted to be connected thereto, automatic switching means associated with each machine for effecting the automatic starting and the automatic connection thereof to said electric circuit, each automatic switching means comprising a master relay which when energized effects the starting of the machine controlled thereby and when deenergized effects the shutting down of the machine controlled thereby, control means for controlling the energization and deenergization of one of said master relays, protective means for effecting the deenergization of said one of said master relays when the automatic switching means controlled thereby fails to establish a predetermined connection within a predetermined time, electromagnetically operated means arranged when energized to effect the energization of another one of said master relays, a circuit for said electromagnetically operated means, and contacts in said last mentioned circuit arranged to be closed only when said one of said master relays is deenergized.

4. In combination, a plurality of sources of current, an electric circuit, switching means associated with each source for connecting it to said electric circuit, a master relay associated with each switching means arranged when energized to effect the operation of its associated switching means to connect the associated source to said electric circuit, a circuit for each master relay, contacts in the circuit of one of said master relays adapted to be operated to effect the energization of said one of said master relays, a time delay emergency starting relay arranged to effect the completion of the circuit of another one of said master relays, a circuit for said emergency starting relay arranged to be completed when said contacts are operated to effect the energization of said one of said master relays, and contacts in said emergency starting relay circuit arranged to be closed when said one of said master relays is in its deenergized position.

5. In combination, a plurality of sources of current, an electric circuit, automatic switching means associated with each source for effecting a connection between its associated source and said circuit, a plurality of master elements adapted to be operated in succession to effect the successive operation of said automatic switching means, switching means adapted to be operated to change the sequence in which said automatic starting means are operated by said master elements, and means whereby said switching means may be operated to change the sequence in which said automatic switching means are operated without interrupting the supply of current to said circuit while it is being supplied by one or more of said sources comprising means for controlling said automatic switching means independently of said master elements to effect the connection of said sources to said circuit.

6. In combination, a plurality of sources of current, an electric circuit, automatic switching means associated with each source for effecting a connection between its associated source and said circuit, each automatic switching means comprising a master relay which when energized effects the operation of its associated switching means to connect the associated source to said circuit, a plurality of master elements adapted to be operated in succession to effect the successive operation of said automatic switching means, switching means adapted to be operated to change the connections of said master relays so as to change the sequence in which said sources are connected to said circuit in response to the successive operation of said master elements, and means for effecting the energization of said master relays independently of said master elements to permit said switching means to be operated to change the sequence in which said automatic switching means are operated while said circuit is being supplied by one of said sources.

7. In combination, two sources of current, an electric circuit, automatic switching means assoicated with each source for effecting a connection between its associated source and said circuit, each automatic switching means comprising a master relay which when energized effects the operation of its associated switching means to effect the connection between its associated source and said circuit, a master element adapted to be operated to effect the energization of one of said master relays, a second master element adapted to be operated to effect the energization of the other master relay after said first master starting element has been operated, switching means adapted to be operated to change the connections of said master relays so as to change the sequence in which the connections between said sources and said circuit are effected in response to the successive operation of said master elements, and other switching means adapted to be operated to complete the circuits of both master relays independently of said master elements and said sequence changing switching means so that said sequence changing switching means may be operated to change the sequence without interrupting the supply of current to said electric circuit when it is being supplied by one or more of said sources.

8. In combination, two sources of current, an electric circuit, automatic switching means associated with each source for effecting the connection between its associated source and said circuit, each automatic switching means comprising a master relay which when energized effects the operation of its associated switching means to effect the connection between its associated source and said circuit, a master element adapted to be operated to effect the energization of one of said master relays, a change over switch adapted to be operated to place either of said master relays under the control of said master element, and means for energizing both of said master relays independently of said master element and said change over switch to permit said change over switch to be operated without effecting an interruption in the supply of current to said electric circuit.

9. In combination, two sources of current, an electric circuit, transforming means associated with each source, automatic switching means associated with each transforming means for effecting the connection thereof between its associated source and said electric circuit, each automatic switching means comprising a master relay which when energized effects the operation of the automatic switching means to effect the connection of the associated transforming means and when deenergized effects the disconnection of the associated transforming means, a master element adapted to be operated to effect the energization of one of said master relays, a change over switch connected and arranged so that either of said master relays may be placed under the control of said master element, and means adapted to be operated to effect the completion of circuits for both of said master relays which are independent of said change over switch whereby said change over switch may be operated to change the connection of said master relays to change the normal sequence in which said automatic switching means operate without effecting the deenergization of said master relays.

10. In combination, two sources of current, an electric circuit, automatic switching means associated with each source for effecting a connection between the associated source and said electric circuit, a master relay associated with each automatic switching means arranged when energized to effect the operation of its associated automatic switching means, a master element, electromagnetically operated means normally adapted to be operated to control the energization of one of said master relays, a circuit for said electromagnetically operated means normally arranged to be energized by the source with which said one of said master relays is associated, means operative upon the failure of the voltage of the source associated with said one of said master relays to change the connections of said electromagnetically operated means so that the circuit thereof is energized by the other source, and contacts in the circuit of said electromagnetically operated means controlled by said master element.

11. In combination, two sources of current, an electric circuit, automatic switching means associated with each source for effecting a connection between the associated source and said electric circuit, a master element, electromagnetically operated means arranged to be controlled by said master element to effect the operation of an automatic switching means, means adapted to be operated to select either of said automatic switching means as the one to be controlled normally by said master element and to connect said electromagnetically operated means so that it is arranged to be energized by the source whose associated automatic switching means is selected to be controlled normally by said master element, and means operative upon the failure of the voltage of the source associated with the selected automatic switching means to change the connections of said electromagnetically operated means so that it is arranged to be energized from the other source.

12. In combination, two sources of current, an electric circuit, automatic switching means associated with each source for effecting a connection between the associated source and said electric circuit, a master element, electromagnetically operated means arranged to be controlled by said master element to effect the operation of an automatic switching means, a voltage responsive device, switching means adapted to be operated to select either of said automatic switching means as the one to be controlled normally by said master element and to connect said electromagnetically operated means and said voltage responsive means so that they are energized by the source whose associated automatic switching means is selected to be controlled normally by said master element, and means controlled by said voltage responsive means for changing the connection of said electromagnetically operated means so that they are arranged to be energized from the other source when the source which normally energizes said voltage responsive device fails.

13. In combination two supply circuits, a distribution circuit, a rotary transformer associated with each supply circuit, automatic switching means associated with each transformer for connecting it between its associated supply circuit and said distribution circuit, each automatic switching means comprising a master relay which when energized effects the operation of the automatic switching means, a relay responsive to the voltage of said distribution circuit, a time delay relay normally arranged to effect the energization of one of said master relays, a circuit for said time delay relay normally arranged to be energized from the supply circuit with which said one of said master relays is associated and to be controlled by said voltage relay so that said time delay relay effects the energization of said one of said master relays when the voltage of said distribution circuit remains below a predetermined value for a predetermined length of time, and means operative upon the failure of said one of said master relays to become energized when said voltage relay is in a position to effect the energization thereof to change the connections of said time delay relay so that it is energized from the other supply circuit and to place the other master relay under the control of said time delay relay.

14. In combination two supply circuits, a distribution circuit, a rotary transformer associated with each supply circuit, automatic switching means associated with each transformer for connecting it between its associated supply circuit and said distribution circuit, each automatic switching means comprising a master relay which when energized effects the operation of the automatic switching means, a relay responsive to the voltage of said distribution circuit, a time delay relay normally arranged to effect the energization of one of said master relays, a circuit for said time delay relay normally arranged to be energized from the supply circuit with which said one of said master relays is associated and to be controlled by said voltage relay so that said time delay relay effects the energization of said one of said master relays when the voltage of said distribution circuit remains below a predetermined value for a predetermined length of time, and means operative upon the failure of the voltage of the supply circuit with which said one of said master relays is associated to change the connections of said time delay relay so that it is energized from the other supply circuit and to place the other master relay under the control of said time delay relay so that the automatic switching means with which it is associated is operated when the voltage of said distribution circuit remains below a predetermined value for a predetermined length of time.

15. In combination, an electric circuit, two sources of current, automatic switching means associated with each source for connecting it to said circuit, control means adapted to be operated to effect the operation of one of said automatic switching means to control the connection of one of said sources to said circuit, other control means for effecting the operation of the other one of said automatic switching means to control the connection of the other one of said sources to said circuits, means operative upon the failure of said one of said automatic switching means to effect a predetermined connection in response to the operation of said first mentioned control means to place said other automatic switching means under the control of said first mentioned control means, means for effecting the operation of said one of said automatic switching means to connect said one of said sources to said electric circuit while said other source is connected thereto and the automatic switching means therefor is under the control of said first mentioned control means, and means operative when a predetermined connection is made between said one of said sources and said circuit while said other source is connected thereto and the automatic switching means therefor is under the control of said first mentioned control means to place said one of said automatic switching means under the control of said first mentioned control means and the other automatic switching means under the control of the other control means.

16. In combination, an electric circuit, two sources of current, automatic switching means associated with each source for connecting it to said circuit, control means adapted to be operated to effect the operation of one of said automatic switching means to control the connection of one of said sources to said circuit, electromagnetically operated means adapted to be energized to place said other automatic switching means under the control of said control means, a circuit for said electromagnetically operated means, contacts in said last mentioned circuit controlled by said control means, and other contacts in said last mentioned circuit arranged to be opened when both of said sources are connected to said electric circuit.

17. In combination, an electric circuit, two sources of current, automatic switching means associated with each source for connecting it to said circuit, control means adapted to be operated to effect the operation of one of said automatic switching means to control the connection of one of said sources to said circuit, other control means for effecting the operation of the other one of said automatic switching means to control the connection of the other one of said sources to said circuits, means operative upon the failure of said one of said automatic switching means to effect a predetermined connection in response to the operation of said first mentioned control means to place said other automatic switching means under the control of said first mentioned control means, means for effecting the operation of said one of said automatic switching means to connect said one of said sources to said electric circuit while said other source is connected thereto and the automatic switching means therefor is under the control of said first mentioned control means, means operative after said one of said sources has been connected to said circuit while said other source is connected thereto and the automatic switching means therefor is under the control of said first mentioned control means to place said one of said automatic switching means under the control of said first mentioned control means and the other automatic switching means under the control of the other control means, and means for selecting the automatic switching means to be controlled normally by each control means.

18. In combination, an electric circuit, two sources of current, automatic switching means associated with each source for connecting it to said circuit, control means adapted to be operated to effect the operation of one of said automatic switching means to control the connection of one of said sources to said circuit, electromagnetically operated means adapted when energized to place the other automatic switching means under the control of said first mentioned control means, a circuit for said electromagnetically operated means arranged to be completed upon the failure of said one of said automatic switching means effecting a predetermined connection within a predetermined time, contacts in said last mentioned circuit controlled by said first mentioned control means, and means for completing the circuit of said electromagnetically operated means independently of said contacts upon the failure of voltage of said one of said sources.

19. In combination two sources of current, an electric circuit, automatic switching means associated with each source for effecting a connection between the associated source and said electric circuit, a master element, control relays normally arranged to control the operation of one of said automatic switching means, circuits for said control relays controlled by said master element and normally arranged to be energized from the source with which said one of said automatic switching means is associated, electromagnetically operated means adapted to be operated to effect a change in the connections of said control relays so that they are arranged to be energized by the other source and to place said other automatic switching means under the control of said control relays, and means responsive to the voltage of the source associated with said one of said automatic switching means for effecting the operation of said electromagnetically operated means.

20. In combination two sources of current, an electric circuit, automatic switching means associated with each source for effecting a connection between the associated source and said electric circuit, a master element, control relays normally arranged to control the operation of one of said automatic switching means, circuits for said control relays controlled by said master element and normally arranged to be energized from the source with which said one of said automatic switching means is associated, electromagnetically operated means adapted to be operated to effect a change in the connections of said control relays so that they are arranged to be energized by the other source and to place said other automatic switching means under the control of said control relays, means operative upon the failure of said one of said automatic switching means to effect a predetermined connection in response to the operation of said master element to effect the operation of said one of said electromagnetically operated means, and means responsive to the voltage of the source associated with said one of said automatic switching means for effecting the operation of said electromagnetically operated means independently of said master element.

21. In combination, two sources of current, an electric circuit, automatic switching means associated with each source for effecting a connetion between the associated source and said electric circuit, a master element, electromagnetically operated means normally adapted to be operated to control the operation of one of said automatic switching means, a circuit for said electromagnetically operated means normally arranged to be energized by the source with which said one of said automatic switching means is associated, means operative upon the occurrence of predetermined abnormal conditions of said one of said automatic switching means and its associated source to change the connections of said electromagnetically operated means so that the circuit thereof is energized by the other source, and contacts in the circuit of said electromagnetically operated means arranged to be controlled by said master element.

22. In combination, two sources of current, an electric circuit, automatic switching means associated with each source for effecting a connection between the associated source and said electric circuit, a master element, electromagnetically operated means arranged to be controlled by said master element to effect the operation of an automatic switching means, means adapted to be operated to select either of said automatic switching means as the one to be controlled normally by said master element and to connect said electromagnetically operated means so that it is arranged to be energized by the source whose associated automatic switching means is selected to be controlled normally by said master element, and means operative upon the occurrence of predetermined abnormal conditions of said one of said automatic switching means and its associated source to change the connections of said electromagnetically operated means so that it is energized from the other source and effects the operation of the other automatic switching means.

23. In combination, two supply circuits, a distribution circuit, a rotary transformer associated with each supply circuit, automatic switching means associated with each transformer for connecting it between its associated supply circuit and said distribution circuit, each automatic switching means comprising a master relay which, when energized, effects the operation thereof, a master element, a time relay normally arranged to effect the energization of one of said master relays, a circuit for said time relay normally arranged to be energized from the supply circuit with which said one of said master relays is associated and to be controlled by said master element, and means responsive to a predetermined abnormal condition of said one of said switching means to change the connection of said time relay so that it is energized from the other supply circuit and effects the operation of the other switching means.

24. In combination, an electric circuit, two sources of current, switching means associated with each source for connecting it to said circuit, control means normally arranged to control the operation of one of said switching means, means controlled by a predetermined condition of said one of said switching means for placing the other of said switching means under the control of said control means and for removing said one of said switching means from the control of said control means, and means operative in response to a predetermined subsequent connection between said one of said sources and said circuit for restoring said one of said switching means to the control of said control means and removing said other switching means from the control thereof.

25. In combination, an electric circuit, two sources of current, switching means associated with each source for connecting it to said circuit, control means normally arranged to control the operation of one of said switching means, means operative upon the failure of said one of said switching means to effect a predetermined connection in response to the operation of said control means to place the other switching means under the control of said control means and to remove said one of said switching means from the control thereof, and means operative when both of said sources are subsequently supplying current to said electric circuit in a predetermined manner for restoring said one of said switching means to control of said control means and removing said other switching means from the control thereof.

26. In combination, a distribution circuit, two rotary transformers, automatic switching means associated with each transformer and arranged to effect the starting and stopping thereof and the connection and disconnection thereof to and from the distribution circuit, control means normally arranged to control the operation of one of said switching means whereby the associated transformer may be started and connected to said distribution circuit in response to certain conditions and disconnected from said circuit and shut down in response to other conditions, means operative upon the failure of the said one of said switching means to effect a predetermined connection within a predetermined time for removing said one of said switching means from the control of said control means and for placing the other switching means under the control thereof, and means operative when both of said rotary transformers are subsequently connected to said distribution circuit in a predetermined manner for restoring said one of said switching means to the control of said control means and removing the other switching means from the control thereof.

In witness whereof I have hereunto set my hand this 5th day of February, 1925.

HERMAN BANY.